United States Patent [19]

Matsuura et al.

[11] Patent Number: 5,032,916

[45] Date of Patent: Jul. 16, 1991

[54] METHOD OF DETECTING SIGNAL WAVEFORM DISTURBANCE IN RECEIVED TELEVISION PICTURE SIGNAL

[75] Inventors: Shigeo Matsuura, Yokohama; Susumu Takayama, Tokyo; Hiroshi Miyazawa, Tokyo; Masao Usui, Tokyo; Shigehiro Ito, Yokohama; Reiichi Kobayashi, Osaka, all of Japan

[73] Assignees: Hitachi, Ltd.; Nippon Hoso Kyokai, both of Tokyo, Japan

[21] Appl. No.: 440,346

[22] Filed: Nov. 22, 1989

[30] Foreign Application Priority Data

Mar. 23, 1989 [JP] Japan ............................ 1-69179

[51] Int. Cl.⁵ .................... H04N 5/213; H04N 9/64
[52] U.S. Cl. ................................ 358/167; 358/36; 358/905; 455/296
[58] Field of Search ............ 358/167, 36, 905, 147; 455/296

[56] References Cited

U.S. PATENT DOCUMENTS

| | | | |
|---|---|---|---|
| 4,476,491 | 10/1984 | Murata et al. | 358/167 |
| 4,502,077 | 2/1985 | Morotomi et al. | 358/167 |
| 4,517,601 | 5/1985 | Yamada et al. | 358/167 |
| 4,559,560 | 12/1985 | Murata et al. | 358/167 |
| 4,625,241 | 11/1986 | Ohzeki | 358/147 |
| 4,667,241 | 5/1987 | Saito et al. | 358/167 |

OTHER PUBLICATIONS

Shinichi Makino et al, "A Novel Automatic Ghost Canceller", IEEE Transactions on Consumer Electronics, vol. CE-26, pp. 629-636, Aug. 1980.

Masaharu Obara et al, "A TV Ghost Canceller Using a CCD Transversal Filter", IEEE Transactions on Broadcasting, vol. BC-29, No. 2, pp. 60-71, Jun. 1983.

Primary Examiner—John K. Peng
Attorney, Agent, or Firm—Stevens, Davis, Miller & Mosher

[57] ABSTRACT

For canceling ghost components disturbing a received picture signal waveform in the television transmission such as the television broadcast, ghost components of a reference pulse signal inserted at a central portion of a horizontal scanning period in a vertical blanking period of a picture signal is detected and then the received picture signal is processed such as those ghost components of the inserted reference signal are canceled by each other. In this signal processing, an auxiliary reference signal, the waveform and/or the level of which differ from those of the principal reference signal, the latter being occasionally almost zero, is inserted in a horizontal scanning period delayed from the principal reference signal by a repetition period after the lapse of which regular controlling signals such as synchronizing signals and color bursts having just the same waveform, level and phase reappear. In the differential signal waveform between received picture signals respectively neighboring both of reference signals, regular controlling signals are canceled by each other, while ghost components consisting of remaining waveforms except the difference between both of reference signals only are left, so as to facilitate the accurate detection of ghost components even exceedingly delayed over one half of a horizontal scanning period.

9 Claims, 14 Drawing Sheets

FIG_1

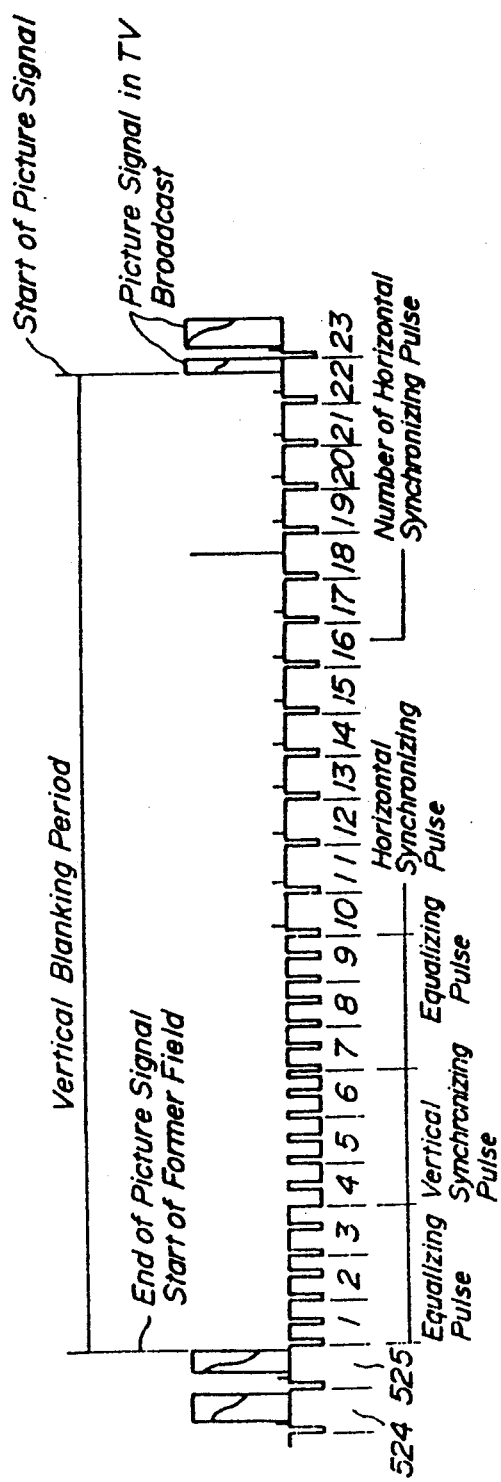

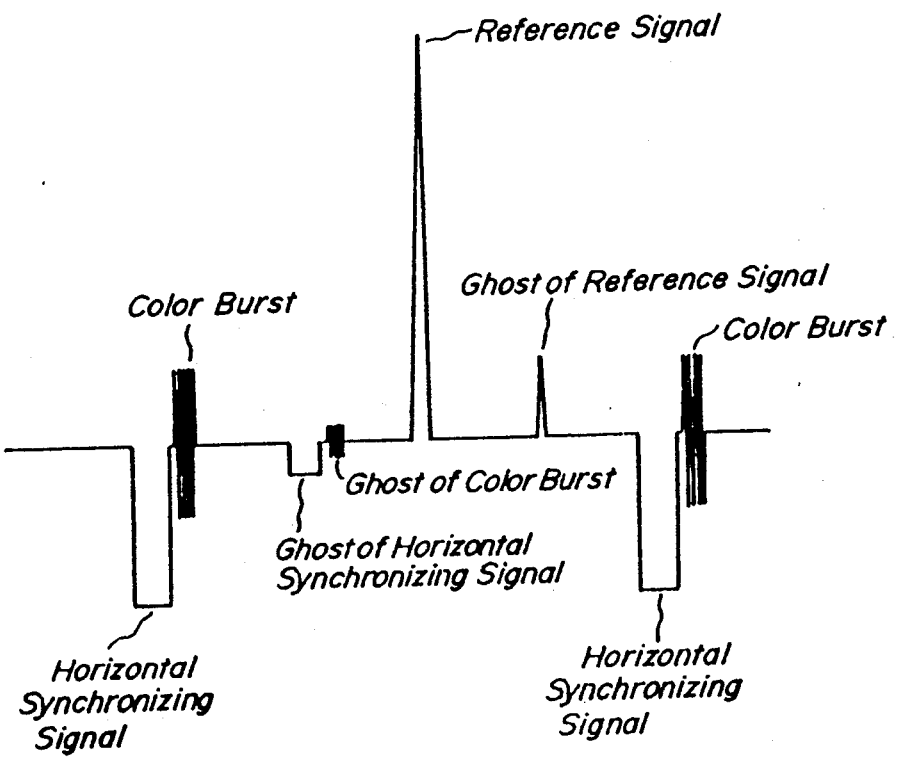
FIG_4
PRIOR ART

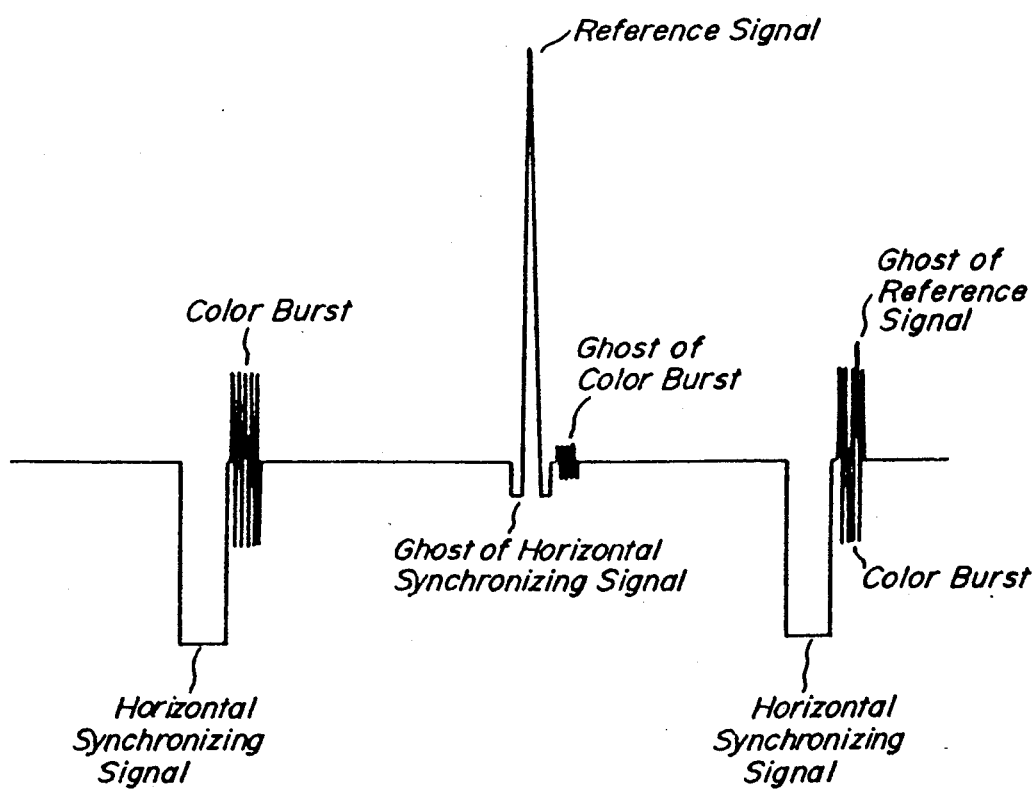
FIG_5
PRIOR ART

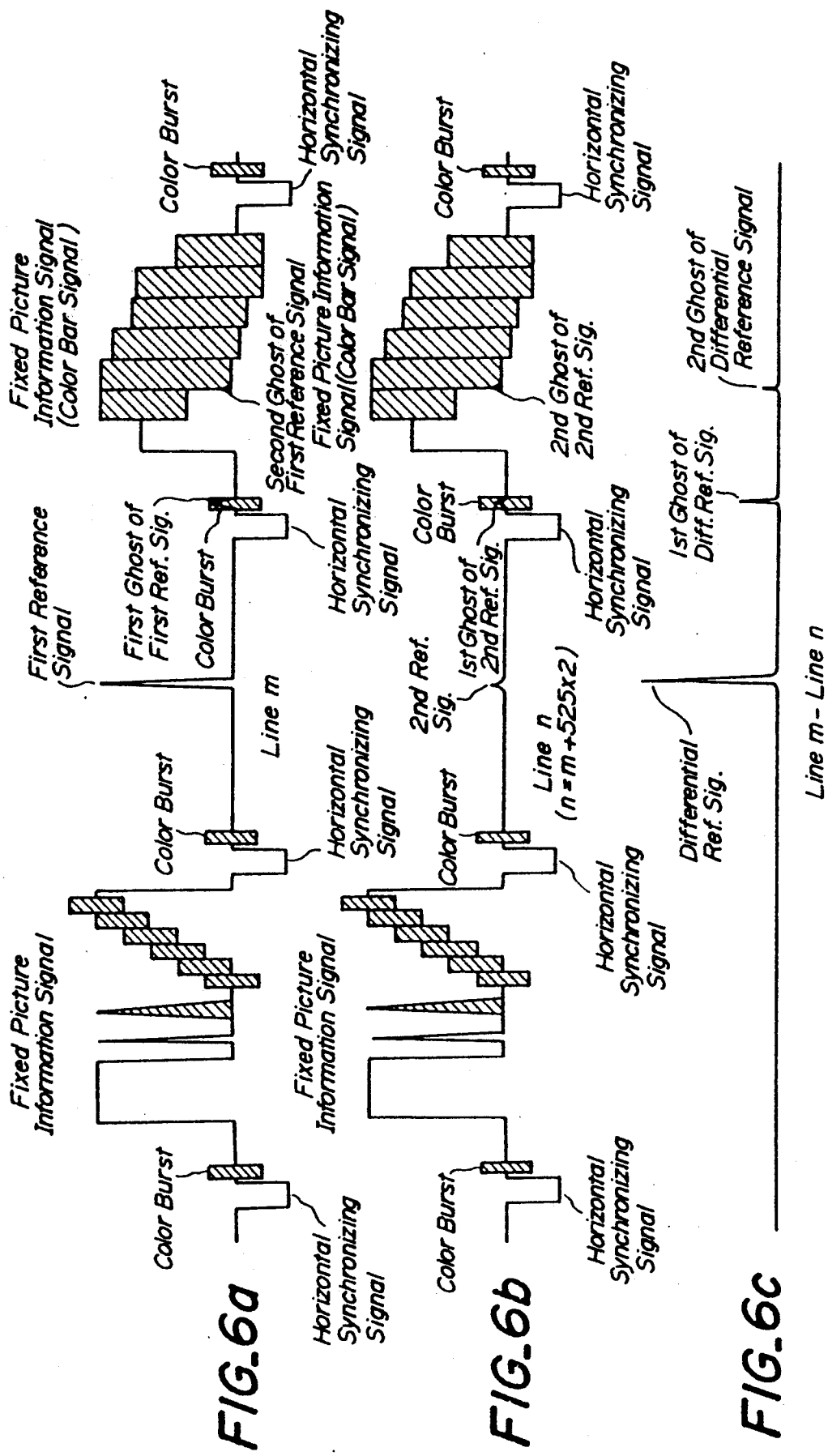

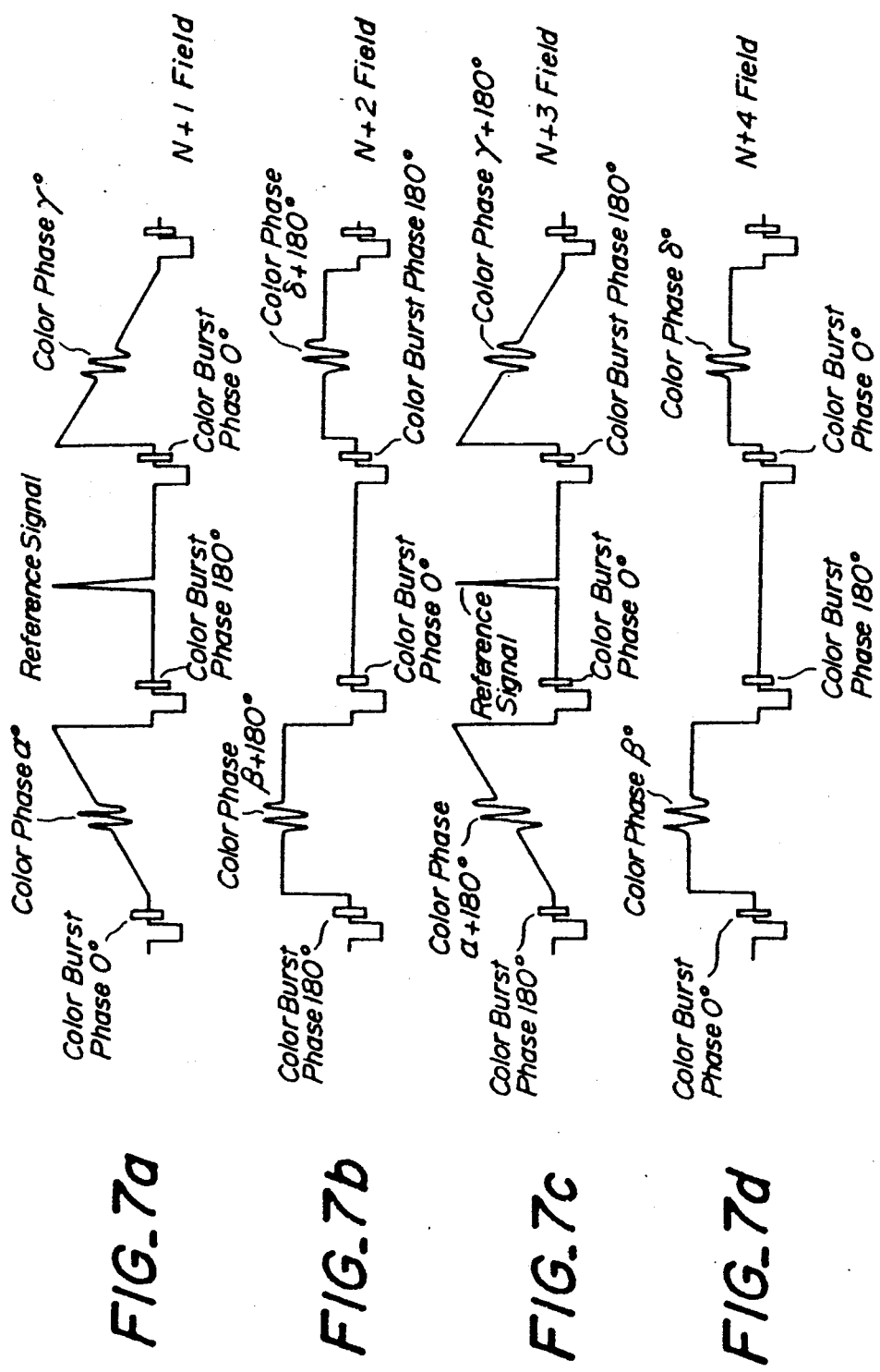

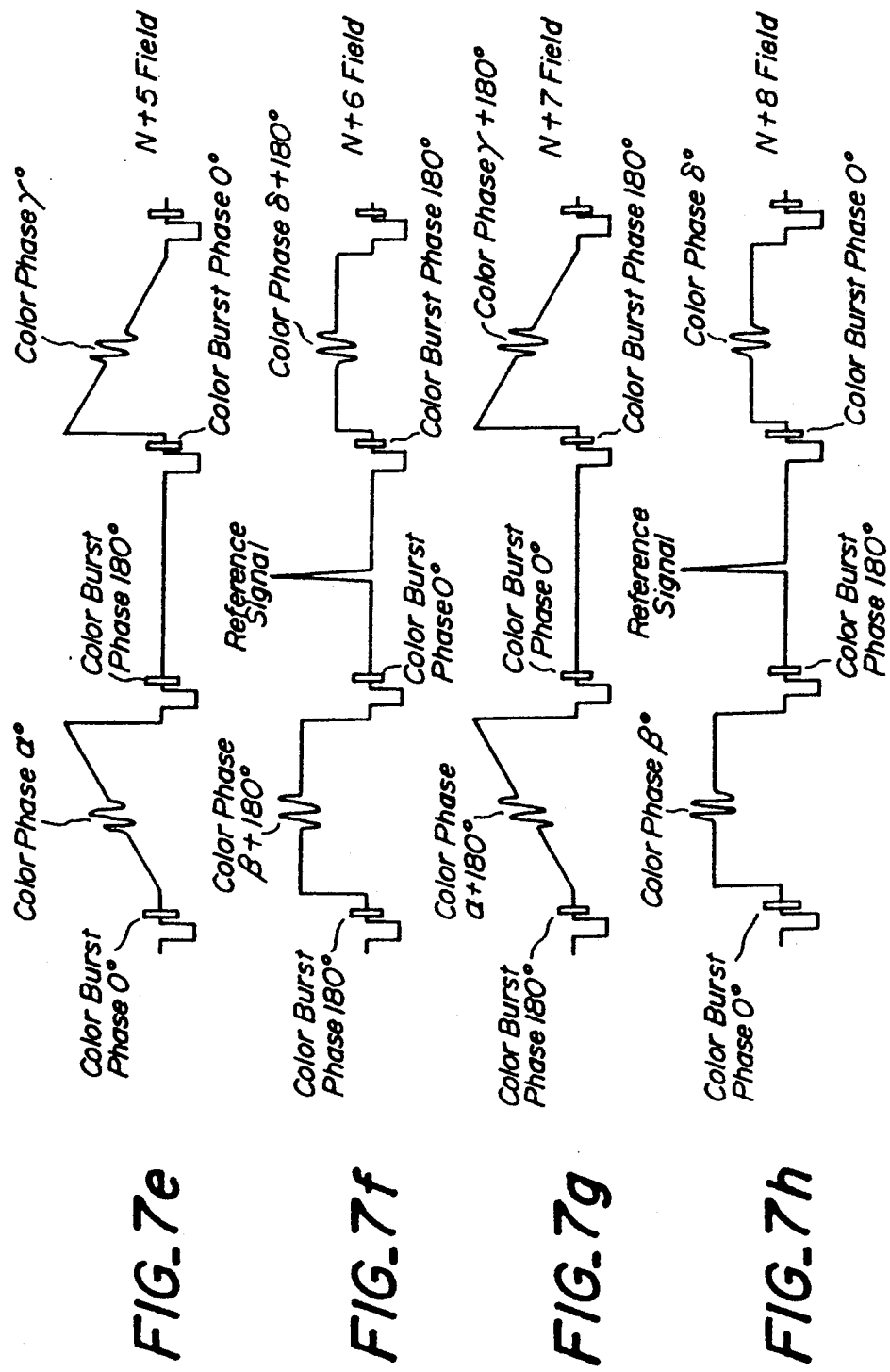

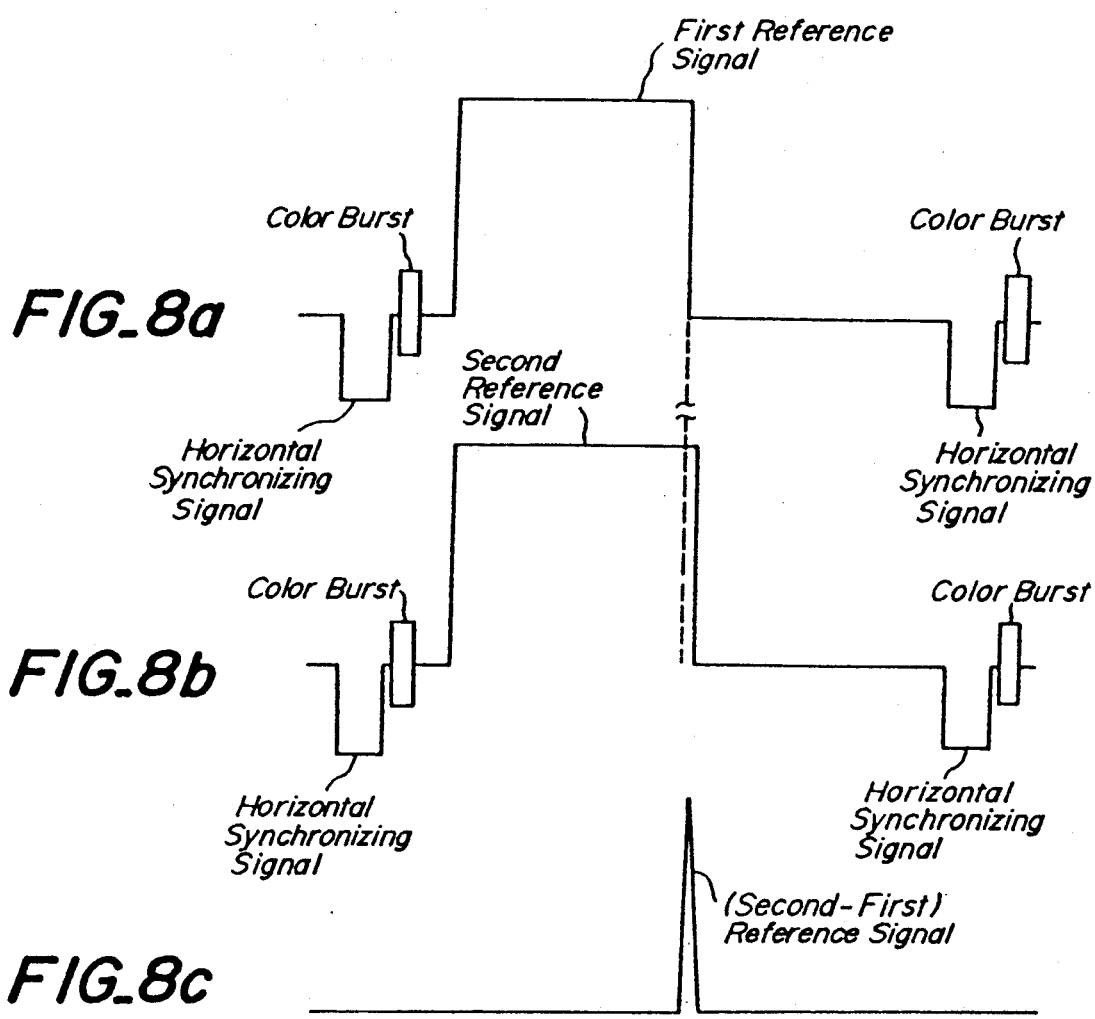

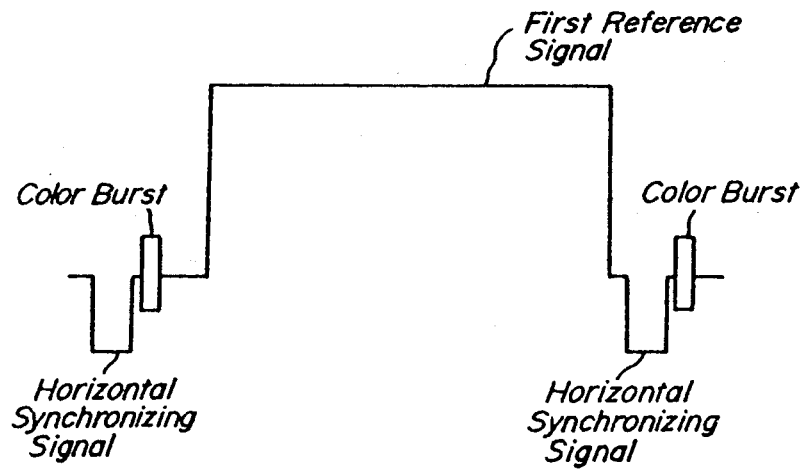
FIG._9a
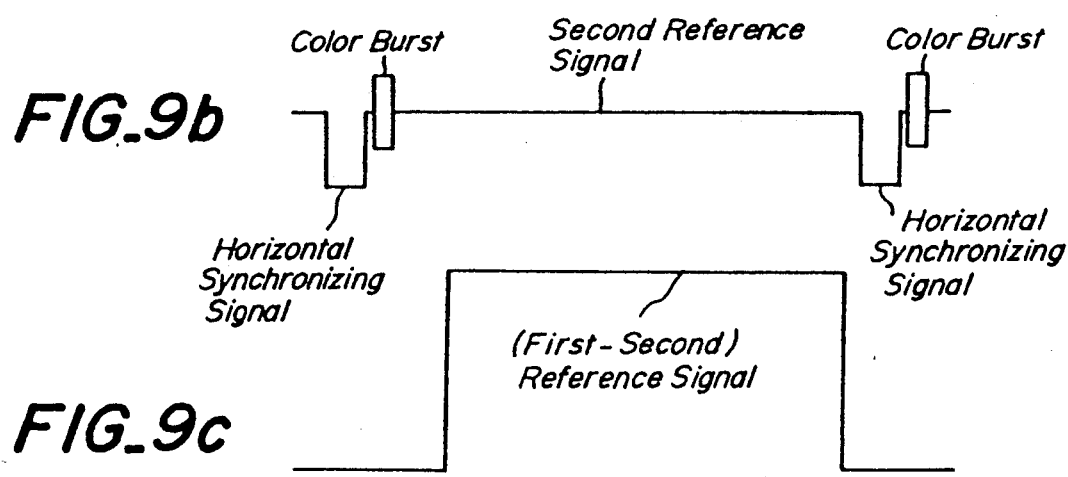
FIG._9b
FIG._9c
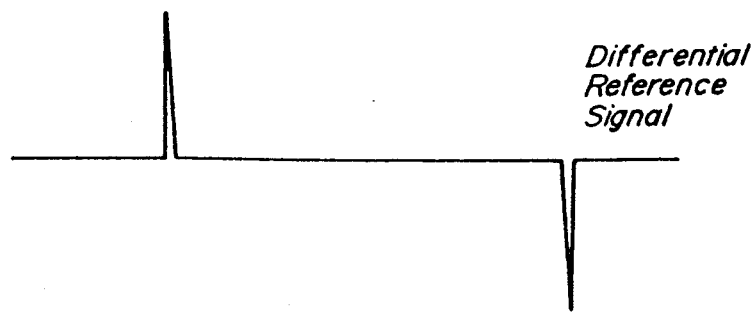
FIG._9d

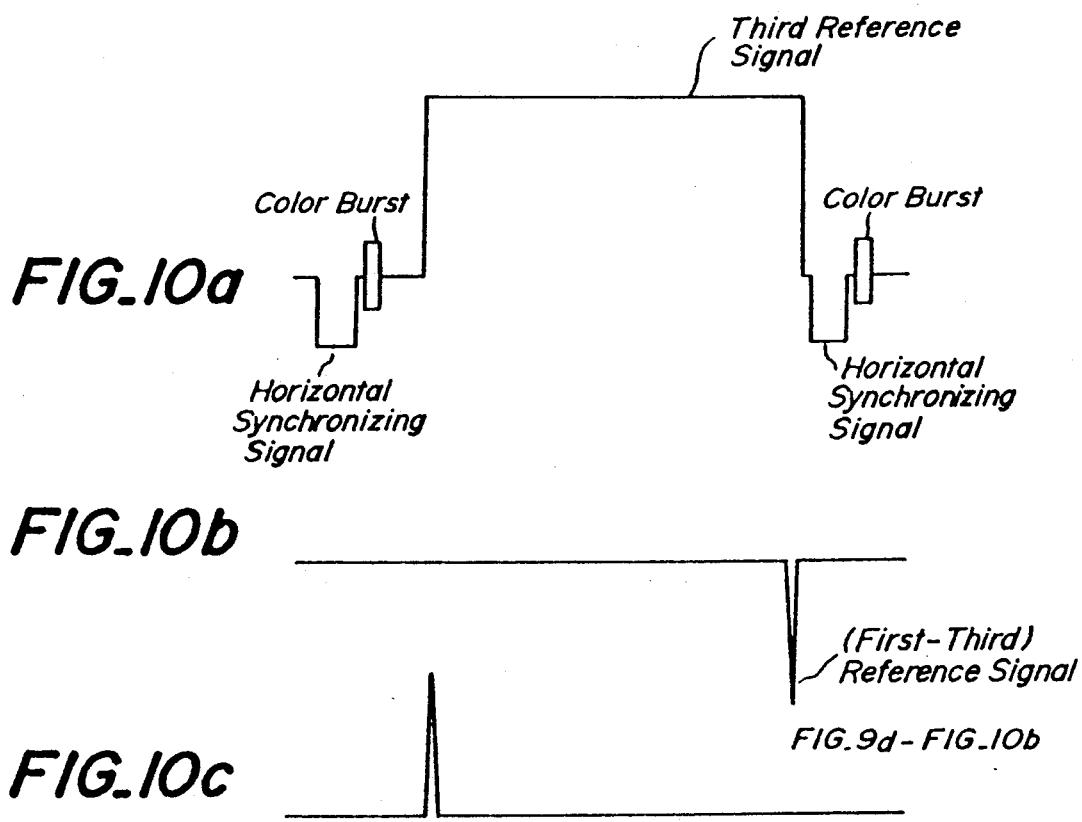

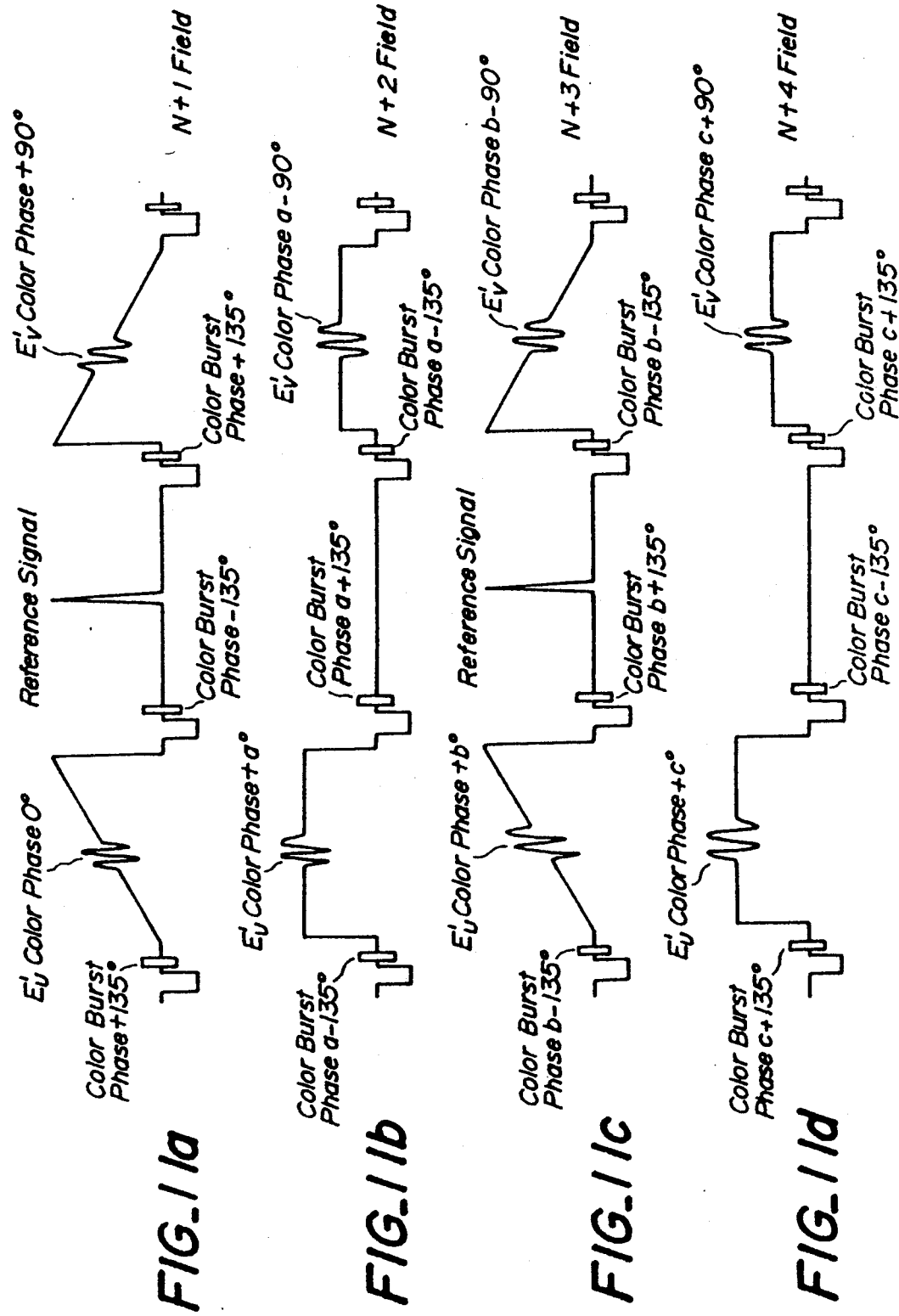

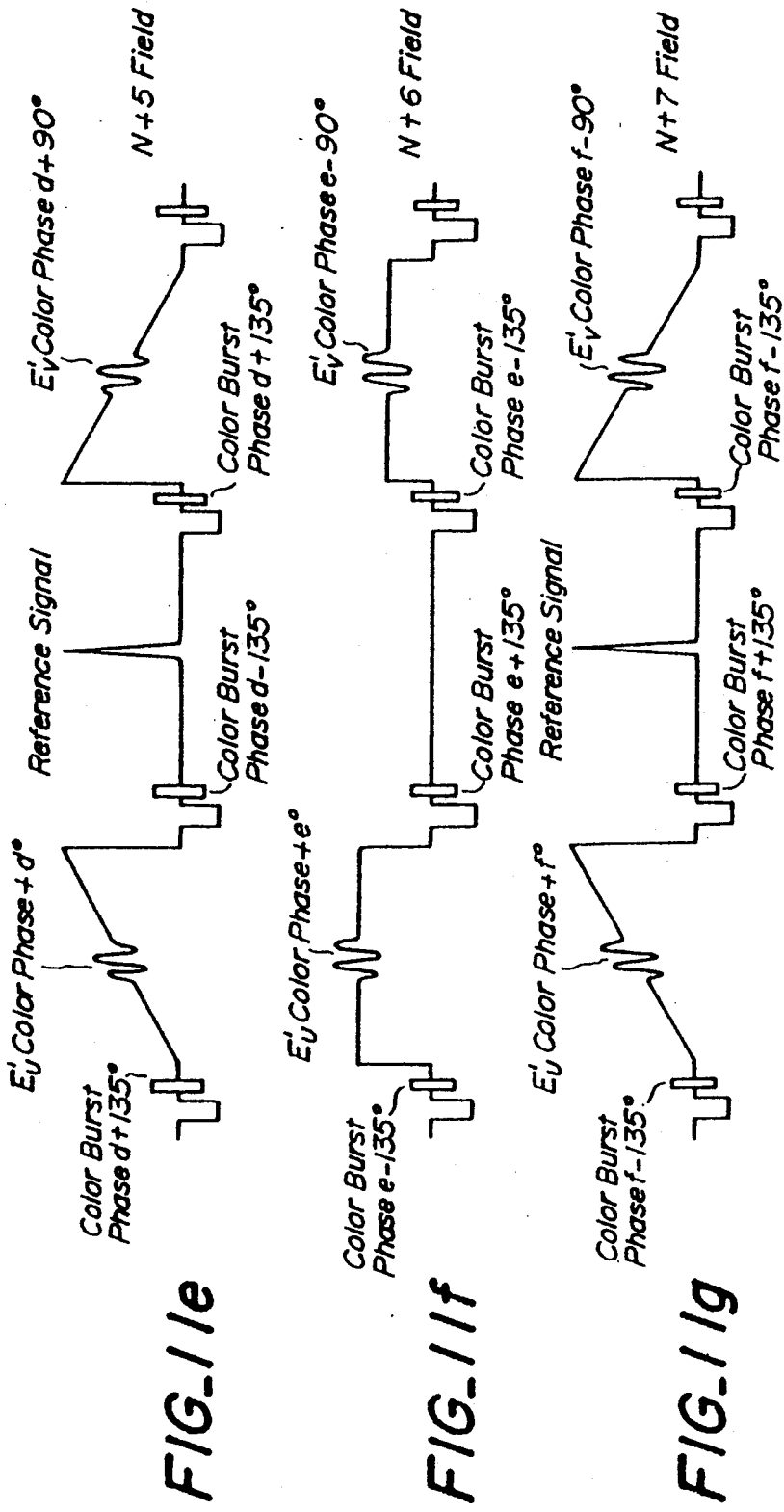

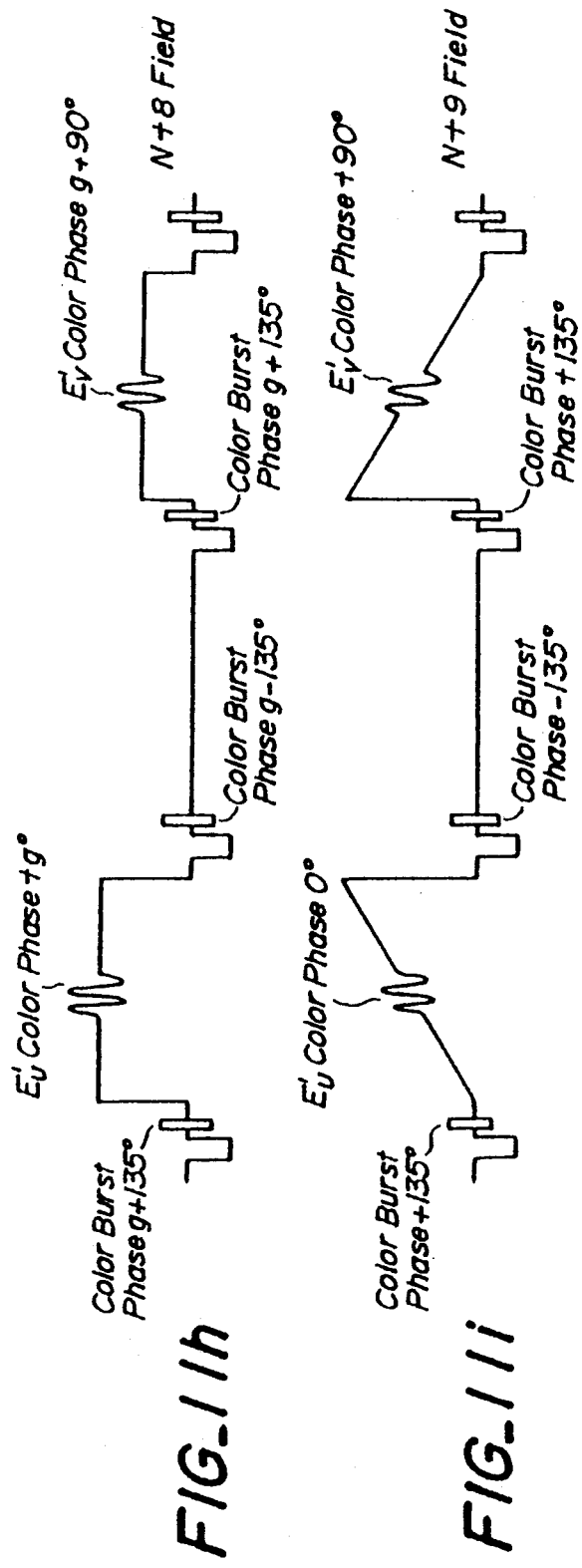

METHOD OF DETECTING SIGNAL WAVEFORM DISTURBANCE IN RECEIVED TELEVISION PICTURE SIGNAL

BACKGROUND OF THE INVENTION

1. Field of the Invention

The present invention relates to a method of detecting undesired signals for cancellation thereof which intermix into a received picture signal in a television signal transmission and hence disturb a signal waveform thereof, for instance, a so-called ghost in a television broadcast, more particularly to the method which is improved so as to extend a range of delay time of the detectable undesired signals such as the ghost, remarkably wider in comparison with the conventional method.

2. Description of the Prior Art

In the ghost cancellation technique which is conventionally effected for removing the ghost components from the received picture signal of the television broadcast, on a sending side, a ghost canceling reference (GCR) signal, which is added to the picture signal in a predetermined horizontal scanning period of a vertical blanking period thereof, is sent, and, on a receiving side, received signal components of the GCR signal itself and ghosts thereof are extracted from the received picture signal and the received ghost components are detected by referring to another GCR signal which is generated on the receiving side, and then the received picture signal is supplied to a ghost canceling filter having a filtering property controlled such that the detected ghost components are canceled, so as to cancel the ghost.

The principle of operation of the aforesaid ghost canceler is based on the employment of a transversal filter which is formed to combine the received picture signals which are successively delayed and the levels of which are adjusted, so as to cancel actual ghost components intermixed into the received picture signal by ghost components which are generated on the receiving side from received signal waveforms of the ghost canceling reference (GCR) signal having the predetermined signal waveform and the predetermined signal level. Accordingly, the GCR signal is added in the midst of a horizontal scanning period in a vertical blanking period, which horizontal scanning period is blanked except regular controlling signals such as a horizontal synchronizing signal, so as to facilitate the aforesaid treatment of ghost components of the GCR signal. However, the detection of those actual ghost components of the GCR signal is disturbed by the superposition thereon of the ghost component of the immediately preceding horizontal synchronizing signal or the superposition thereof on the immediately succeeding horizontal synchronizing signal. As a result, the range of delay time of the detectable and removable actual ghost component is restricted within one half of the horizontal scanning period.

On the other hand, often the ghost component actually disturbing the receipt of the television broadcast is delayed by about 40 μs, which exceeds one half of the horizontal scanning period, e.g. due to reflection from remote high buildings or electrical transmission lines on remote mountains. Consequently, so long as the range of delay time of the detectable ghost component is not exceedingly extended over one half of the horizontal scanning period, the disturbance on the receipt of television broadcast, which is caused by the ghost, cannot be sufficiently prevented, so that the exceeding extension of the range of delay time of the detectable ghost component is a serious problem.

SUMMARY OF THE INVENTION

An object of the present invention is to solve the above problem and hence to provide a method of detecting signal waveform disturbance in a received television picture signal whereby a ghost component having a long delay time exceeding one half of the horizontal scanning period can be surely and readily detected and hence canceled.

Another object of the present invention is to provide a method of detecting a signal waveform disturbance in a received picture signal whereby a ghost component of a reference pulse added in a horizontal scanning period in a vertical blanking period of a picture signal can be surely and readily detected without the disturbance caused by the existence of any regular controlling signals such as a horizontal synchronizing signal and a color burst which neighbor thereto.

According to the present invention attaining the above objects, on a sending side, a first reference signal provided for detecting the signal waveform disturbance of the received picture signal, which is caused by undesired intermixed signals such as the ghost, is added in a predetermined horizontal scanning period of the picture signal, as well as a second reference signal having the signal waveform or the signal level, which is different from that of the first reference signal, is added at the same position in another predetermined horizontal scanning period apart from the above predetermined horizontal scanning period by plural field periods, which are set up in consideration of the periodicity of television picture signal such that the same signal waveform and the same signal phase appear periodically with regard to the regular color signal such as the color burst, as well as signal components having repeatedly just the same signal waveform such as the horizontal scanning signal and fixed picture signals, whilst, on a receiving side, the difference of signal waveform between respective received picture signals neighboring to the first and the second reference signals respectively is obtained. In this obtained differential signal waveform, all of the regular controlling signals such as the horizontal synchronizing signal and the color burst and the fixed picture signal, which have the same signal waveform and the same signal phase repeatedly therebetween, and all of the ghost components of those signals are canceled by each other to zero, whilst the difference between the respective reference signals having different signal waveforms or different signal phases and respective ghost components of those reference signals is left alone and hence can be surely and readily detected.

In other words, the method of detecting the signal waveform disturbance of the received television picture signal according to the present invention is featured in that, for detecting and removing an undesired signal which intermixes into and disturbs a signal waveform of a received picture signal in the television picture signal transmission, on a picture signal sending side, a first reference signal having a predetermined signal waveform and a predetermined signal phase is added at a predetermined point in a picture information transmission duration of a first predetermined horizontal scanning period of the picture signal concerned, as well as a second reference signal, at least either one of the predetermined signal waveform and the predetermined signal phase of which is different from those of the first reference signal, is added at the predetermined point in a picture information transmission duration of a second predetermined horizontal scanning period apart from the first predetermined horizontal scanning period by a repetition period or an integral multiple thereof, after lapse of which regular controlling signals having the same signal waveform, signal level and signal phase respectively with those in the first predetermined horizontal scanning period appear firstly, whilst, on a picture signal receiving side, a differential signal waveform of received picture signals between respective pluralities of horizontal scanning periods neighboring and including the first and the second predetermined horizontal scanning periods respectively is obtained, whereby the undesired signal can be detected as a remaining signal waveform excepting a differential signal waveform between the first and the second reference signals in the obtained differential signal waveform concerned.

As a result, according to the present invention, in the cancellation of the ghost causing the disturbance in the receipt of television broadcast, it is possible to surely and readily detect ghost components having an extensively longer delay time than the conventional delay time of this kind, so as to sufficiently cancel it, so that the present invention presenting thus remarkable operational effect can be applied onto all of television systems such as the NTSC system and the like, and further widely applied, for instance, onto the ghost canceler, the waveform equalizer, the ghost measuring apparatus and the like.

BRIEF DESCRIPTION OF THE DRAWINGS

For the better understanding of the invention, reference is made to the accompanying drawings, in which:

FIG. 3 is a diagram showing a signal waveform in a vertical blanking period of a television picture signal;

FIG. 4 is a diagram showing an example of an operational waveform of a conventional ghost canceler;

FIG. 5 is a diagram showing another example of the same;

FIGS. 6a–6c are diagrams showing an examples of an operational waveform of a ghost canceler according to the present invention;

FIGS. 7(a)–7(h) are diagrams successively showing the periodicity of an NTSC picture signal;

FIGS. 8(a) to 8(c) are diagrams successively showing examples of a ghost canceling reference signal according to the present invention;

FIGS. 9(a) to 9(d) are diagrams successively showing other examples of the same;

FIGS. 10(a) to 10(c) are diagrams successively showing further other examples of the same;

FIGS. 11(a) to 11(i) are diagrams successively showing the periodicity of a PAL picture signal.

Figure 1:
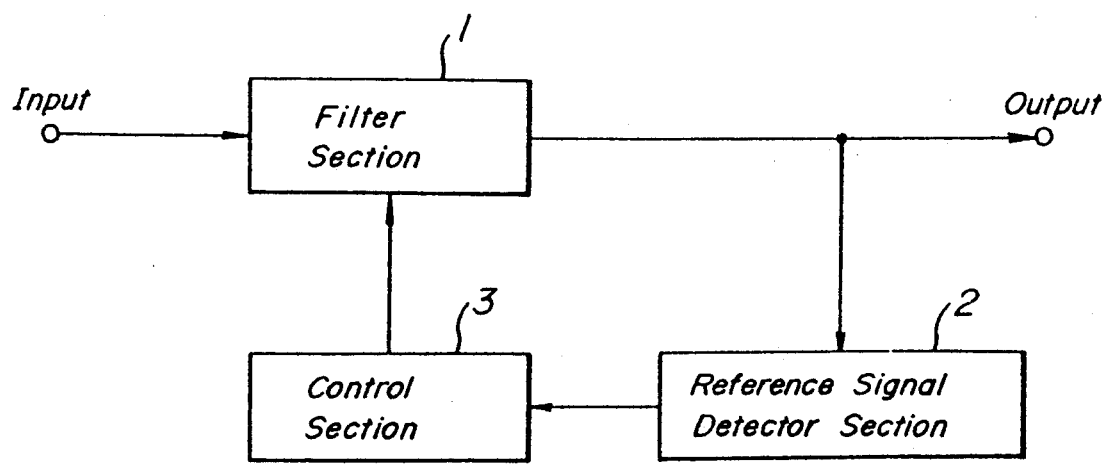
FIG. 1 is a block diagram showing an outlined structure of a ghost canceler.

Throughout different views of the drawings, reference numerals are employed

1 ... filter section
2 ... reference signal detector section
3 ... control section
$4_{-M} \sim 4_0, 4_1 \sim 4_N$ ... delay
$5_{-M} \sim 5_0, 5_1 \sim 5_N$ ... (coefficient) multiplier
6 ... adder
7 ... tap-gain memory
8 ... reference waveform generator circuit
9 ... subtracter
10 ... tap-gain corrector circuit

DESCRIPTION OF THE PREFERRED EMBODIMENTS

The present invention will be described in detail hereinafter by referring to the drawings principally with regard to the embodiment of a ghost detector in the receipt of television broadcast.

First, FIG. 1 shows an outlined structure of a ghost canceling apparatus for detecting and removing ghost components in a received picture signal on a receiving side of the television broadcast, that is, a so-called ghost canceler. The ghost canceler as shown in FIG. 1 is formed of a filter section 1 for canceling actual ghost components in a received picture signal by generating appropriate ghosts of a picture signal concerned, a reference signal detector section 2 for detecting a ghost canceling reference (GCR) signal and ghost components thereof in an output signal of the filter section 1 and further for detecting amplitudes, delay times and the like of those ghost components by referring to another GCR signal internally generated, and a control section 3 for controlling the filtering property of the filter section 1 in accordance with outputs of the detector section 2, so as to facilitate the cancellation of the actual ghost components.

Figure 2:
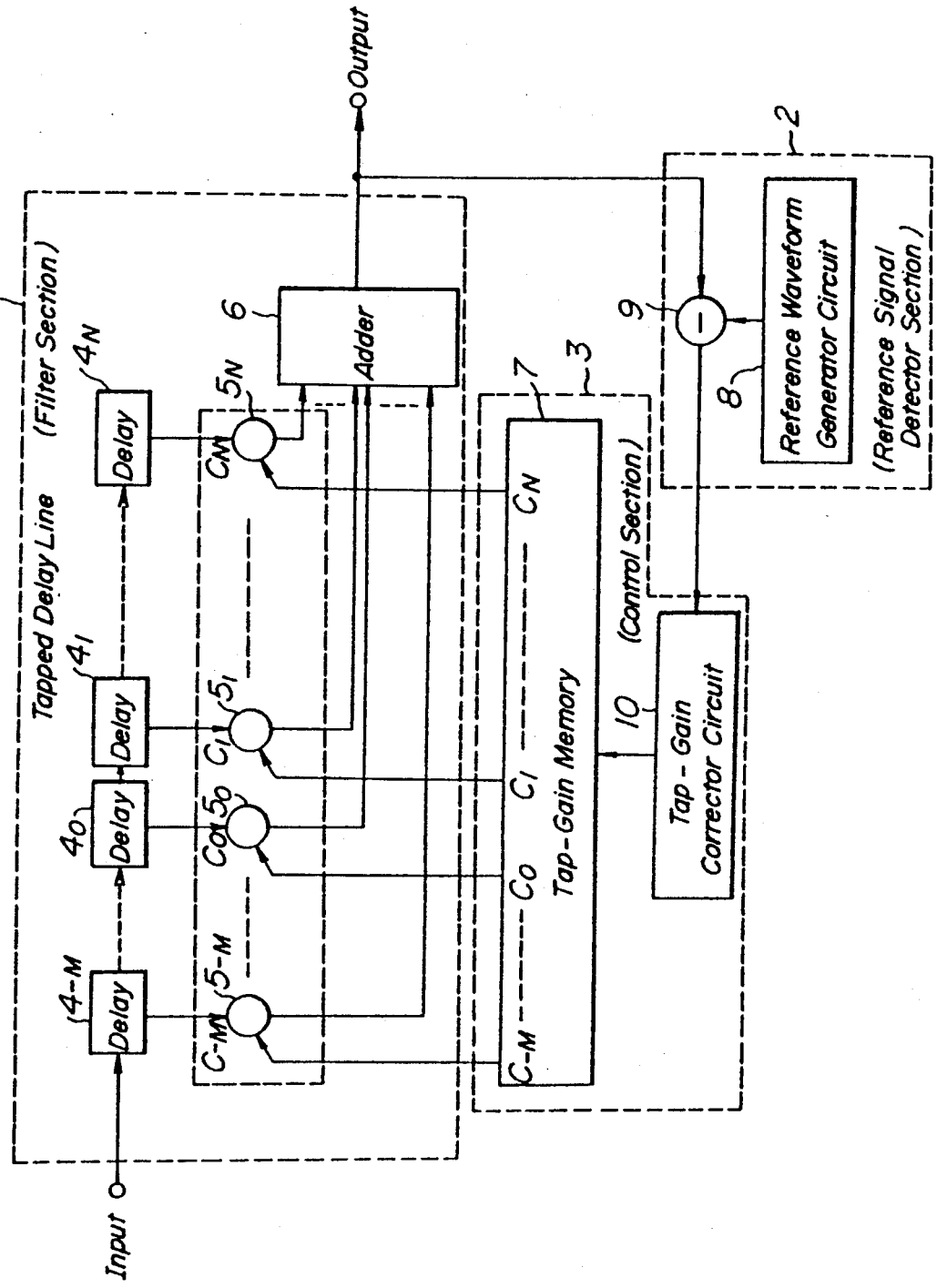
FIG. 2 is a block diagram showing a detailed structure of the same.

FIG. 2 shows a detailed structure of the ghost canceler as outlined above. In the detailed structure as shown in FIG. 2, each of the portions corresponding respectively to those sections 1 to 3 as outlined in FIG. 1 are indicated by individually surrounding block lines. The filter section 1 as shown in detail consists of a so-called transversal filter, which consists of a tapped delay line formed by serially connecting plural delay elements $4_{-M}$ to $4_0$ and $4_1$ to $4_M$, so as to derive successively delayed input signals from plural taps apart from each other by a predetermined delay time, plural multipliers $5_{-M}$ to $5_0$ and $5_1$ to $5_N$ for obtaining desired tap gains by multiplying successively delayed signals from those taps with desired coefficients $C_{-M}$ to $C_0$ and $C_1$ to $C_N$ respectively, and an adder 6 for obtaining a total sum by adding individual outputs of those multipliers to each other. As a result, when the individual coefficients C used for the multipliers 5 are appropriately set up, an originally received picture signal proper, from which actual ghost components are removed, can be obtained as an output of the adder 6.

The received picture signal as the added output of adder 6 includes ghost components corresponding to the difference between the GCR signals in those different horizontal scanning periods as separated from each other by the predetermined number of the periods concerned, until each of the sections of the ghost canceler attain to the lastly aligned state respectively. Thus this added output is supplied to the subtracter 9 in the reference signal detector section 8, while the GCR signal generated by the reference signal generator section 8 on the receiving side is supplied to the same, so as to detect the difference between those GCR signals together with ghost components thereof which are left in this added output and then to supply the detector output signals to the control section 3.

In the control section 3, the detector output signal is supplied to a tap-gain corrector circuit 10, so as to obtain a coefficient of the tap-gain corresponding to the amplitude of remaining ghost components in each of the successive delay times in the filter section 1. Thus obtained coefficients $C_{-M}$ to $C_0$ and $C_1$ to $C_N$ in each of successive delay times are memorized in each of the multipliers $5_{-M}$ to $5_0$ and $5_1$ to $5_N$ in the filter section 1 respectively, so as to correct the property of the transversal filter in such a direction as the remaining differential GCR ghost component left in the filter output signal are extinguished. As a result of the repetition of this consecutive operation, the remaining differential GCR ghost components are sufficiently canceled at last and hence an ideal receiving condition wherein the actual ghost components intermixed in the picture signal concerned are sufficiently canceled also can be attained.

In this connection, the transversal filter as shown in FIG. 2 is one of a so-called non-circulation type, so that the feedback loop as mentioned above is required to be additionally added for the aforesaid repetition of the consecutive operation. However, the desired ghost canceler can be constructed by employing the transversal filter of so-called circulation type.

In the ghost canceler for detecting the ghost components according to the aforesaid operational effect, it is required to internally generate a ghost canceling reference (GCR) signal having just the same signal waveform as that of the GCR signal contained in the received picture signal to be supplied to the transversal filter and hence to predetermine the signal waveform and the signal level of the GCR signal to be employed between both of the sending and the receiving sides.

On the other hand, the signal waveform customarily used a the ghost canceling reference (GCR) signal is usually a rectangular pulse or a pulse having a specified rising form of a unit function, that is, a bar signal, for instance, a leading edge of a vertical synchronizing signal, a differentiated or differential waveform of a T bar or a 2T bar and further so called (sin x)/x bar, (sin x)/x reverse bar, (sin x)/x pulse, pseudo random signal train. By the way, the vertical synchronizing signals have a slightly different waveform between various actual broadcasting stations and hence have a weak correlation with each other.

The GCR signal consisting of various bar signals or various pulse signals which present a rising or falling performance fitted for the test of the aforesaid transmission property is generally inserted at the substantially central position of one of the 10th to 21st horizontal scanning periods, for instance, the 18th period, in which no picture information is usually transmitted, in the vertical blanking period of the first field, which is arranged as shown in FIG. 3, or, one of 273rd to 284th horizontal scanning periods, for instance, 281st period in the vertical blanking period of the second field, which is arranged as the same. FIG. 3 shows a typical case such that the GCR signal consisting of a 2T pulse is inserted at the central position of the 18th horizontal scanning period.

The signal waveform of the received picture signal in the 18th horizontal scanning period added with the GCR signal as exemplified above is varied, for instance, as shown in FIG. 4, by the intermix of the ghost components which are delayed within one half of the usual delay time range 0 to 37 μs. In this case, ghost components of the horizontal synchronizing signal and the color burst which precedes the GCR signal do not reach the GCR signal, while ghost components of the GCR signal do not reach the horizontal synchronizing signal and the color burst which succeed the GCR signal, so that it is possible to exactly detect the GCR signal inserted in the received picture signal and ghost components thereof and hence to effectively utilize those detected signals and signal components for the ghost canceling process.

However, in a case that the signal waveform concerned is varied, for instance, as shown in FIG. 5, by the intermix of the ghost components which are delayed over one half of the usual delay time range 0 to 37 μs and hence over one half of the horizontal scanning period, ghost components of the preceding horizontal synchronizing signal overlap the inserted GCR signal, while ghost components of the inserted GCR signal overlap the succeeding color burst, so that it is impossible to exactly detect the GCR signal inserted in the received picture signal and ghost components thereof and hence to effect the required ghost canceling process. As a result, as described before, the conventional ghost detectable delay time range according to effectively utilizing the inserted GCR signal is restricted within one half of the horizontal scanning period.

According to the method of detecting signal waveform disturbance in received television picture signal of the present invention, a ghost canceling reference (GCR) signal adding method to be called "a field sequence method", for instance, "an eight field sequence method" with regard to a colored picture signal of NTSC system is applied for removing the above restriction of the ghost detectable delay time range and for spreading the delay time range concerned over one half of the horizontal scanning period. In particular, two kinds of GCR signals having respective waveforms and/or respective levels which are different from each other are inserted respectively into two horizontal scanning periods corresponding to each other in two fields apart from each other by plural fields, particularly, in respective vertical blanking periods of those two fields, in which regular control signals such as horizontal synchronizing signals, color bursts and the like and further, for instance, fixed picture information signals to be transmitted in the adjacent horizontal scanning periods take firstly just the same signal waveforms and signal phases with each other. Then, the difference of the picture signals between respective plural horizontal scanning periods respectively including those two horizontal scanning periods inserted respectively with those two kinds of GCR signals is obtained. In this differential picture signal, the difference between those two kinds of GCR signals and ghost components thereof only are left in an exactly detectable state, while all of the other remaining signals are canceled by each other.

FIGS. 6(a) to 6(c) show in order examples of waveforms of picture signals or received picture signals in case the aforesaid eight field sequence method is applied on an NTSC colored picture signal. FIG. 6(a) shows an example of the picture signal waveform in case a 2T pulse only is transmitted as the first GCR signal in a horizontal scanning period (line m) appointed as described above. FIG. 6(b) shows another example of the picture signal waveform in case the second GCR signal consisting of another 2T pulse having an extremely low level or substantially zero level in comparison with that of the first GCR signal is transmitted in another horizontal scanning period (line n) appointed in a relation $n=m+525\times2$. So that, in these two appointed horizontal scanning periods, namely, in these two lines m and n, the horizontal synchronizing signals have just the same signal waveform and just the same signal level, as well as the color bursts have just the same waveform, just the same level and further just the same phase also. In this connection, in respective adjacent horizontal scanning periods preceding and succeeding these appointed periods, fixed colored picture information signals or color bar signals as shown in those Figures, which have just the same waveform, level and phase, are transmitted. As a result, in the differential picture signal between these appointed lines m and n, the difference between the first and the second GCR signals only is left as shown in FIG. 6(c), while the other remaining signal components having just the same waveform, level and phase are entirely canceled to zero by each other.

When ghost components are intermixed into the received picture signal waveform arranged as described above, and for simplicity those ghost components are shown with regard to the GCR in the Figure, even if the delay time of those ghost components is long and hence ghost components of the GCR signal overlap the succeeding color burst or color bar signal, the differential signal components of those succeeding signals are canceled by each other, while ghost components of the GCR signals only are apparently left, so as to facilitate the exact detection thereof.

In particular, for instance, in the differential signal components between two horizontal scanning periods apart from each other by 4 fields of the received NTSC colored picture signal, horizontal synchronizing signals as well as color bursts and fixed colored picture information signals in adjacent horizontal scanning periods are entirely canceled by each other, while the GCR signals having different waveforms and/or different levels from each other and further ghost components thereof can be exactly detected.

In this connection, the time interval, at which the differential signal component is obtained, is set up onto 4 fields, because, if this time interval is set up within 4 fields, color signal components, the phases of which are cyclically varied at a 4 field period, cannot be canceled, although brightness signal components can be canceled by each other because of the identity of the waveform and the level.

More particularly, in the NTSC colored picture signal, as successively shown in FIGS. 7(a) to 7(h), the phase of the color signal is cyclically varied at a period of a 4 fields, so that, at 4 field interval, the picture signal having just the same waveform, level and phase reappears periodically. Consequently, in the received picture signal waveform disturbance detection according to the present invention, the time interval required for leaving the differential components between the first and the second GCR signals and further ghost components thereof only is set up onto 8 fields in consideration of the correlation of fixed picture information signals superposed on respectively preceding and succeeding lines also.

In this connection, the received picture signal waveform disturbance detection of the present invention can not be widely applied only onto the picture signal of NTSC system, but also onto television picture signals of all other types of systems, and hence the same operational effect as described above can be attained by inserting the first and the second GCR signals at a time interval of repetition at which just the same picture signal reappears cyclically in accordance with the respective periodicity of the picture signal of the system concerned.

Next, suitable examples of setting up of the signal waveform and the signal level as for the first and the second ghost canceling reference (GCR) signals will be described hereinafter. In this connection, according to the present invention also, the conventional GCR signals having various customary waveforms can be arbitrarily employed of course.

First, the first GCR signal is formed of a 2T pulse and the like as it is, as shown in FIG. 6(a), while the second GCR signal is formed of a pulsive GCR signal having an extremely low level such as zero or substantial zero, as shown in FIG. 6(b), so that the differential GCR signal becomes substantially the same as the first GCR signal as it is, as shown in FIG. 6(c).

Next, when the first and the second GCR signals are formed of substantially the same bar signal having just the same levels and slightly different widths from each other as shown in FIGS. 8(a) and 8(b) respectively, the rising positions of the first and the second bar signals are spaced apart from the horizontal synchronizing signals of the respective lines in which they are inserted by the same time duration, while the falling positions thereof are slightly different from each other relative to the horizontal synchronizing signals, so that the differential GCR signal consists of a pulse corresponding to the difference of the respective falling positions as shown in FIG. 8(c). In this connection, it is also possible that the falling positions are just the same with each other, while the rising positions are slightly different from each other.

Next, as another embodiment the first GCR signal consists of a bar signal having a long time duration which is substantially equal to the picture information transmitting time duration of the horizontal scanning period, as shown in FIG. 9(a), while the second GCR signal consists of a bar signal concerned having a zero-level, as shown in FIG. 9(b), on the receiving side, another bar signal as shown in FIG. 9(c) is obtained by subtracting a received picture signal corresponding to FIG. 9(b) from another received picture signal corresponding to FIG. 9(a) and then the other bar signal concerned is differentiated or is subtracted with the same slightly delayed, so as to form a pair of pulses as shown in FIG. 9(d) for detecting the differential GCR signal and ghost components thereof. As a result, the ghost detectable delay time range is defined by the time duration of the bar signal as shown in FIG. 9(a), and hence the delay time range concerned is extended to 40~50 μs with regard to the NTSC picture signal and thus exceeds one half of the horizontal scanning period, that is, 31.75 μs.

Next, in order to further spread the ghost detectable delay time range according to the bar signal as shown in FIG. 9(a), a third ghost canceling reference (GCR) signal consisting of a bar signal which has the same rising position as that of the bar signal as shown in FIG. 9(a) and a falling position being slightly different, for instance, delayed from that of the latter as shown in FIG. 10(a) is transmitted apart by further 4 fields from the second GCR signal which is apart by 4 fields from the first GCR signal. In this case, on the receiving side, a differential signal waveform as shown in FIG. 10(b) is formed by subtracting the received picture signal waveform as shown in FIG. 10(a) from that as shown in FIG. 9(a) and thereafter a differential GCR signal consisting of a single pulse as shown in FIG. 10(c) is obtained for the ghost detection by subtracting this differential signal waveform as shown in FIG. 10(b) from the pair of pulses as shown in FIG. 9(d). In other words, the ghost detectable delay time range extended over the horizontal scanning period can be obtained by subtractively superposing the differential signal waveform corresponding to the difference between FIGS. 9(a) and 9(b) on that corresponding to the difference between FIGS. 9(a) and 10(b), since the horizontal synchronizing signal and the color burst which succeed the GCR signal are thoroughly canceled by this additive superposition.

In this connection, according to the method of detecting signal waveform disturbance of the present invention also, similarly as the conventional method of this kind, it is important for exactly attaining the signal waveform equalization and the signal waveform disturbance detection for ghost cancellation that the reference signal for detection consists of frequency components in a frequency range being as wide as possible. It is preferable as mentioned before that the rising portion or the falling portion of the pulse signal or the bar signal which is used for the reference signal has the same waveform as that of various conventional reference signals used for the same purpose, for instance, a 2T pulse, a T pulse or a (sin x)/x pulse.

The above description has been effected principally with regard to examples in case that the method of detecting the received picture signal waveform disturbance according to the present invention is applied on the NTSC colored picture signal. However, the present invention can not be applied only on those examples, but can be widely applied also on various television systems with the same operational effect as mentioned above.

For instance, in case that the aforesaid field sequence method is applied on the colored picture signal of PAL system provided with 625 scanning lines and vertical scanning frequency of 50HZ, the first ghost canceling reference (GCR) signal is transmitted in an appointed horizontal scanning period (line m), as shown in FIG. 6(a), while the second GCR signal having an extremely low level or substantial zero level in comparison with that of the first GCR signal is transmitted in another horizontal scanning period (line n) appointed in a relation $n = m + 625 \times 4$, as shown in FIG. 6(b). So that, in these two lines m and n, the horizontal synchronizing signals have just the same signal waveform and just the same signal level, as well as the color bursts have just the same waveform, just the same level and further just the same phase also, As a result, in the differential picture signal between these appointed lines m and n, the difference between the first and the second GCR signals only is left as shown in FIG. 6(c), while the other remaining signal components having just the same waveform, level and phase are entirely canceled to zero by each other, similarly as in the case of the NTSC system.

More particularly, in the PAL colored picture signal, as successively shown in FIGS. 11(a) to 11(i), the phase of the color signal is cyclically varied at a period of 8 fields, so that, at an 8 field interval, the picture signal having just the same waveform, level and phase reappear periodically. Consequently, in the received picture signal waveform disturbance detection according to the present invention, the time interval required for leaving the differential components between the first and the second GCR signals and further ghost components thereof only is set up onto 16 fields in consideration of the correlation of fixed picture information signals superposed on respectively preceding and succeeding lines also.

As is apparent from the above description, according to the present invention, on the sending side, only the first reference signal for canceling the undesired signal waveform such as the ghost is inserted in the appointed horizontal scanning period of the television picture signal, as well as only the second reference signal having the waveform and/or the level which are different from those of the first reference signal is inserted in the other appointed horizontal scanning period apart from the appointed horizontal scanning period by the repetition time interval after which just the same preceding and succeeding signal waveforms adjacent the first reference signal reappear, while, on the receiving side, the differential reference signal is formed by subtracting the received picture signal adjacent the second reference signal from the received picture signal adjacent the first reference signal, so as to remove the horizontal synchronizing signals, the color bursts and the fixed picture information signals which are adjacent the reference signals from each other, as well as to leave only the differential reference signal and ghost components thereof. As a result, it is possible to spread the disturbance detectable delay time range at an extreme extent in comparison with the conventional delay time range over one half of the horizontal scanning period. So that it is possible to obtain a special effect such that the ghost detectable delay time range of the ghost canceler can be extremely extended, as well as the measurable delay time range of the ghost measuring apparatus for measuring the extent of the reception obstruction caused by the ghost disturbance.

In this connection, it is clear of course that the present invention can not be applied not only to the detection of a ghost in television broadcast reception, but also can be widely applied to the detection of undesired signal components similar to the ghost, which are caused by the repeated reflection in the general television transmission, with a similar effect.

What is claimed is:

1. A method of detecting an undesired signal constituting a signal waveform disturbance in a received television picture signal having a time interval of field repetition at which a picture signal having identical regular control signals with a same waveform, a same level and a same phase reappears cyclically in accordance with a given periodicity, said method comprising:
   transmitting a television picture signal;
   adding into said television signal while it is being transmitted a first reference signal having a first predetermined signal waveform and a first predetermined signal level at a predetermined point in a picture information transmission duration of a first predetermined horizontal scanning period of said picture transmission signal;
   adding into said television signal while it is being transmitted a second reference signal having a second predetermined signal waveform and a second predetermined signal level at a predetermined point in a picture information transmission duration of a second predetermined horizontal scanning period of said picture transmission signal, at least one of said second predetermined signal waveform and said second predetermined signal level being different from said first predetermined signal waveform and said first predetermined signal level respectively, said second predetermined horizontal scanning period being separated from said first predetermined horizontal scanning period by said time interval of field repetition or an integral multiple thereof, and said first and said second predetermined horizontal scanning periods containing identical ones of said regular control signals;

receiving said television signal having said first and said second reference signals respectively added thereto;

obtaining a differential signal waveform between respective plural horizontal scanning periods adjacent and including said first and said second predetermined horizontal scanning periods; and detecting and identifying said undesired signal as a remaining signal waveform in said differential signal waveform other than a difference signal between said first and said second reference signals.

2. A method of detecting an undesired signal constituting a signal waveform disturbance in a received television picture signal having a time interval of field repetition at which a picture signal having identical regular control signals with a same waveform, a same level and a same phase reappears cyclically in accordance with a given periodicity, said method comprising:

transmitting a television picture signal;

adding into said television signal while it is being transmitted a first reference signal having a first predetermined signal waveform and a first predetermined signal level at a predetermined point in a picture information transmission duration of a first predetermined horizontal scanning period of said picture transmission signal;

adding into said television signal while it is being transmitted a second reference signal having a second predetermined signal waveform and a second predetermined signal level at a predetermined point in a picture information transmission duration of a second predetermined horizontal scanning period of said picture transmission signal, at least one of said second predetermined signal waveform and said second predetermined signal level being different from said first predetermined signal waveform and said first predetermined signal level respectively, said second predetermined horizontal scanning period being separated from said first predetermined horizontal scanning period by said time interval of field repetition or an integral multiple thereof, and said first and said second predetermined horizontal scanning periods containing identical ones of said regular control signals.

3. A method of detecting an undesired signal constituting a signal waveform disturbance in a received television picture signal having a time interval of field repetition at which a picture signal having identical regular control signals with a same waveform, a same level and a same phase reappears cyclically in accordance with a given periodicity, said method comprising:

transmitting from a picture signal sending side a first reference signal having a first predetermined signal waveform and a first predetermined signal level at a predetermined point in a picture information transmission duration of a first predetermined horizontal scanning period of a picture transmission signal;

transmitting from a picture signal sending side a second reference signal having a second predetermined signal waveform and a second predetermined signal level at said predetermined point in a picture information transmission duration of a second predetermined horizontal scanning period of said picture transmission signal, at least one of said second predetermined signal waveform and said second predetermined signal level being different from said first predetermined signal waveform and said first predetermined signal level respectively, said second predetermined horizontal scanning period being separated from said first predetermined horizontal scanning period by said time interval of field repetition or an integral multiple thereof, and said first and said second predetermined horizontal scanning periods containing identical ones of said regular control signals;

receiving said first and said second reference signals respectively;

obtaining a differential signal waveform between respective plural horizontal scanning periods adjacent and including said first and said second predetermined horizontal scanning periods; and detecting and identifying said undesired signal as a remaining signal waveform in said differential signal waveform other than a different signal between said first and said second reference signals.

4. A method of detecting an undesired signal constituting a signal waveform disturbance in a received television picture signal as claimed in claim 1, 2 or 3 wherein the picture signal is of an NTSC system and the first and the second predetermined horizontal scanning periods are separated by one of 4 fields and 8 fields.

5. A method of detecting an undesired signal constituting a signal waveform disturbance in a received television picture signal as claimed in claim 1, 2 or 3 wherein the picture signal is of a PAL system and the first and the second predetermined horizontal scanning periods are separated by one of 8 fields and 16 fields.

6. A method of detecting an undesired signal constituting a signal waveform disturbance in a received television picture signal as claimed in claim 1, 2 or 3 wherein both of the first and the second reference signals are the same pulse signal and the level of the second reference signal is lower than that of the first reference signal or substantially zero, and a pulse signal corresponding to said difference signal between the first and the second reference signals is formed, so as to be used for the ghost detection.

7. A method of detecting an undesired signal constituting a signal waveform disturbance in a received television picture signal as claimed in claim 1, 2 or 3 wherein the first and the second reference signals are substantially the same rectangular waveform signal, with only the position of the leading or the trailing edge thereof being different from each other, and a pulse signal corresponding to said difference signal between the first and the second reference signals is formed, so as to be used for the ghost detection.

8. A method of detecting an undesired signal constituting a signal waveform disturbance in a received television picture signal as claimed in claim 1, 2 or 3 wherein the first and the second reference signals are the same rectangular waveform signal, while the level of the second reference signal is substantially zero and a pair of pulse signals respectively corresponding to a leading and a trailing edge of a differential rectangular waveform signal between the first and the second reference signals are formed, so as to be used for the ghost detection.

9. A method of detecting an undesired signal constituting a signal waveform disturbance in a received television picture signal as claimed in claim 1, 2 or 3 wherein the first and the second reference signals are the same rectangular waveform signal, while the level of the second reference signal is substantially zero and a pair of pulse signals respectively corresponding to a leading and a trailing edge of a differential rectangular waveform signal between the first and the second reference signals are formed and, in addition thereto, a third reference signal consisting of a rectangular waveform signal being substantially the same as said first reference signal and only a position of a trailing edge of which is different from that of the first reference signal transmitted from the picture signal sending side at the predetermined point in a third predetermined horizontal scanning period separated from the second predetermined horizontal scanning period by a time interval which is equal to the time interval of separation between the first and the second predetermined horizontal scanning periods is adopted, a pulse signal corresponding to the difference between the pair of pulse signals and another pulse signal corresponding to the difference between the first and the third reference signals being formed, so as to be used for the ghost detection.

* * * * *